May 31, 1927.

E. F. WESTON 1,630,592

ELECTRICAL MEASURING INSTRUMENT

Filed Nov. 2, 1925

Inventor:
Edward F. Weston

By Byrnes, Townsend & Brickenstein,
Attorneys.

Patented May 31, 1927.

1,630,592

UNITED STATES PATENT OFFICE.

EDWARD F. WESTON, OF ELIZABETH, NEW JERSEY, ASSIGNOR TO WESTON ELECTRICAL INSTRUMENT CORPORATION, OF NEWARK, NEW JERSEY, A CORPORATION OF NEW JERSEY.

ELECTRICAL MEASURING INSTRUMENT.

Application filed November 2, 1925. Serial No. 66,350.

This invention relates to electrical measuring instruments in general and more particularly to instruments for use in connection with radio receiving sets.

Figure 1:
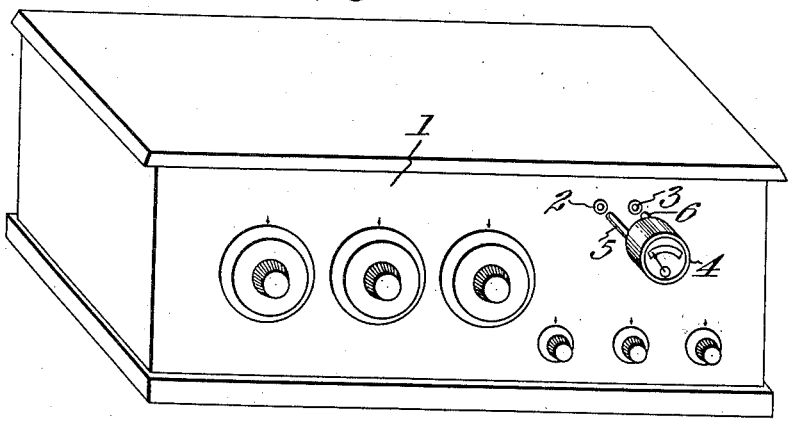
Figure 2:
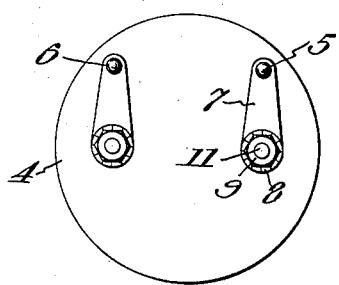
Figure 3:
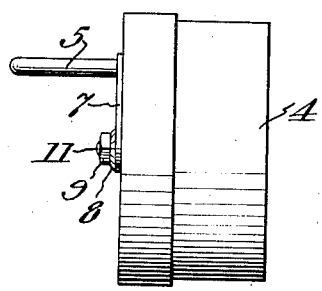
Figure 4:
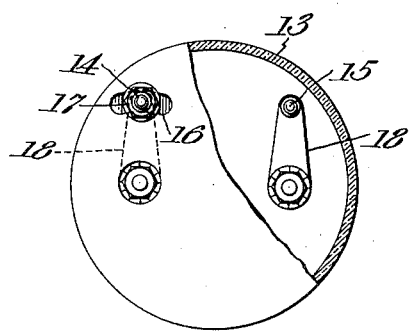
Figure 5:
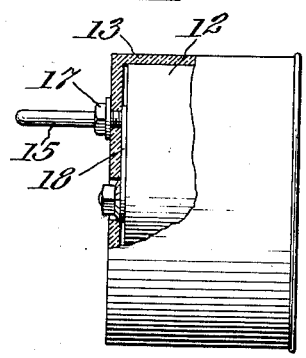

The objects of the invention and its characteristic features are apparent from the description in connection with the accompanying drawings in which, Fig. 1 is a perspective view of a radio receiving set to which the invention is applied;

Figs. 2 and 3 are a rear view and a side view, respectively, of one form of a measuring instrument embodying the invention; and Figs. 4 and 5 are similar views, partly in section, of what I consider the preferred embodiment of the invention.

Having reference to Fig. 1, 1 represents a radio receiving set of any desired construction including a pair of sockets 2 and 3 adapted to receive the terminals of electrical connections adapted to connect an electrical measuring instrument to a desired part of the radio circuit.

The apparatus thus far described represents typical prior art. To control the voltages of the vacuum tubes used in the set or to know at any time the condition of the batteries, it was heretofore practice to connect a voltmeter with the circuit by means of leads provided with terminal pins pushed into the sockets. However, the voltmeter and the leads, not being a part of the receiving set proper, had to be removed after use to take them out of the way and had to be disposed of in some way.

In contradistinction to this practice, I propose to provide an electrical instrument with terminals forming mechanically a part thereof so that the instrument may be attached to and retained on the radio receiving set as a permanent part of the equipment.

Fig. 1 shows a measuring instrument 4 detached from the radio set, but in a position for the pins 5 and 6 to enter the sockets 2 and 3.

Having reference to Figs. 2 and 3, the body 4 of the instrument may have any desired form. However, as an instrument for a radio receiving set, the body may be relatively small having, when in position, the general appearance of a knob.

The pins 5 and 6 may be connected to the body of the instrument in many ways so as to provide a rigid and rugged mechanical unit. For practical considerations, I provide a construction in which the pins 5 and 6 may be adjusted relatively to each other so as to readily enter differently spaced sockets. To this end, fixed studs 11 may extend from within the instrument through the rear wall thereof to form pivots for arms 7 carrying the pins 5 and 6. The arms 7 may be mounted upon the studs 11 by means of spring washers 8 and nuts 9 affording a good mechanical and electrical connection and at the same time permitting relative angular movement of the arms 7 about the studs 11. Thus the pins 5 and 6 may be readily adjusted to suit, within certain limits, all spacing conditions of the sockets. In all positions of adjustment the pins remain parallel to each other and normal to the adjacent wall of the instrument housing.

It is understood that the illustration is solely for the purpose of example.

Figs. 4 and 5 show what is generally known as the flush type of instrument which is contained in a cup or housing, preferably of insulating material.

The terminal pins 14 and 15 extend from the instrument 12 through arcuate slots in the wall of the housing 13. The arms 18, which carry the pins 14 and 15, may be advantageously pivoted on the wall of the housing 13, as indicated, and the electrical connection from the instrument to the arms 18 may be made in any convenient manner. The arcuate slots 16 permit relative angular movement of the pins 14 and 15. In order to permit the setting of the pins for any particular pair of sockets, I preferably provide the pins, outside the housing 13 with screw clamps 17 co-operating with the housing to lock the pins in adjusted position. This screw clamp, which generally represents all forms of clamping means suitable for the particular purpose, has moreover the advantage that it establishes a rigid mechanical connection between the body of the instrument as a whole and the pins.

In the foregoing, I have described what I consider as typical embodiments of the invention. I have specifically referred to two pins, because two separate pins are generally preferable. However, I wish to have it understood that, in analogy with the usual plug type form or connector, only a single stem or pin may be used so far as the principles of the invention are concerned.

In fact, although the invention appears to be simple in character, there is considerable latitude as to its execution.

I claim:

1. An electrical measuring instrument having pin-shaped terminals arranged parallel to each other and means for adjusting the spacing of the latter while maintaining their parallel arrangement.

2. The combination of an electrical measuring instrument, a housing therefor, smooth pin-shaped terminals projecting from and at a predetermined inclination to a wall of said instrument and means for interconnecting said wall and the terminals to form a single mechanical unit, said means being constructed and arranged to permit adjustment of the spacing of the terminals relatively to each other while maintaining the predetermined inclination of the terminals to said wall.

3. The combination of an electrical measuring instrument having fixed studs at one wall thereof, arms pivoted to the respective studs and terminal pins on the respective arms and extending substantially normal to the said wall.

4. The combination of an electrical measuring instrument, a housing therefor, terminal pins for said instrument and projecting through said housing, and means for adjusting the relative position of said pins, said means including studs on the instrument, arms carrying said pins and electrically connected to and mounted upon said studs for angular movement, the housing being provided with arcuate slots defining paths for the movement of the pins.

In testimony whereof, I affix my signature.

EDWARD F. WESTON.